(12) United States Patent
Pendergrass et al.

(10) Patent No.: US 9,727,350 B2
(45) Date of Patent: Aug. 8, 2017

(54) LOCALIZING COMPUTER PROGRAM CODE

(75) Inventors: Eric Addkison Pendergrass, Fort Collins, CO (US); Klaus Muehlbradt, Fort Collins, CO (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 428 days.

(21) Appl. No.: 13/559,255

(22) Filed: Jul. 26, 2012

(65) Prior Publication Data
US 2014/0033184 A1    Jan. 30, 2014

(51) Int. Cl.
G06F 9/45    (2006.01)
G06F 9/44    (2006.01)
G06F 9/445   (2006.01)

(52) U.S. Cl.
CPC .............. *G06F 9/4448* (2013.01); *G06F 8/30* (2013.01); *G06F 8/33* (2013.01); *G06F 8/36* (2013.01); *G06F 8/40* (2013.01); *G06F 8/41* (2013.01); *G06F 8/51* (2013.01); *G06F 8/52* (2013.01); *G06F 8/54* (2013.01); *G06F 8/65* (2013.01)

(58) Field of Classification Search
CPC ..... G06F 8/30; G06F 8/33; G06F 8/36; G06F 8/40; G06F 8/41; G06F 8/51; G06F 8/52; G06F 8/54
USPC ......................................................... 717/136
See application file for complete search history.

(56) References Cited

U.S. PATENT DOCUMENTS

| | | | | |
|---|---|---|---|---|
| 6,490,547 | B1* | 12/2002 | Atkin et al. | 704/8 |
| 7,369,984 | B2* | 5/2008 | Fairweather | 704/8 |
| 7,698,126 | B2* | 4/2010 | Kohlmeier et al. | 704/8 |
| 7,957,954 | B2* | 6/2011 | Chen et al. | 704/8 |
| 8,001,178 | B2* | 8/2011 | Hauduc et al. | 709/203 |
| 8,195,766 | B2* | 6/2012 | Lin et al. | 709/219 |
| 8,265,924 | B1* | 9/2012 | Cutler | 704/8 |
| 8,412,510 | B2* | 4/2013 | Zhou et al. | 704/2 |
| 2003/0004703 | A1* | 1/2003 | Prabhakar et al. | 704/8 |
| 2008/0189096 | A1* | 8/2008 | Apte et al. | 704/2 |
| 2009/0111585 | A1* | 4/2009 | Sakashita et al. | 463/43 |
| 2011/0191703 | A1* | 8/2011 | Doser et al. | 715/763 |
| 2011/0214118 | A1* | 9/2011 | Antill et al. | 717/174 |
| 2013/0085927 | A1* | 4/2013 | Scott | 705/39 |

FOREIGN PATENT DOCUMENTS

CA    2498867 A1 *  8/2006
EP    1315086 B1 *  7/2006

\* cited by examiner

*Primary Examiner* — Qing Chen
*Assistant Examiner* — Andrew M Lyons

(57) ABSTRACT

A method of localizing a computer program code comprises, with a manager node, updating a message catalog, localizing code at the manager node, and distributing the localize code to a number of client nodes. An apparatus for localizing computer program code comprises a processor, and a memory communicatively coupled to the processor, in which the memory comprises a message catalog, and in which the processor updates a message catalog, localizes code at the manager node, and distributes localized code to a number of client nodes.

11 Claims, 5 Drawing Sheets

LOCALIZING COMPUTER PROGRAM CODE

BACKGROUND

Due to competitive international markets, language specific modules are produced that can output information from one language into another language. The language into which the modules are translated may be an end user's native language. This allows the end user to use the module in their native language. Having a module translated correctly in the native language of the end user ensures the end user will correctly receive and understand the various interactive aspects of the module including, for example, prompts by the module, warnings, and user interface information, among others.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
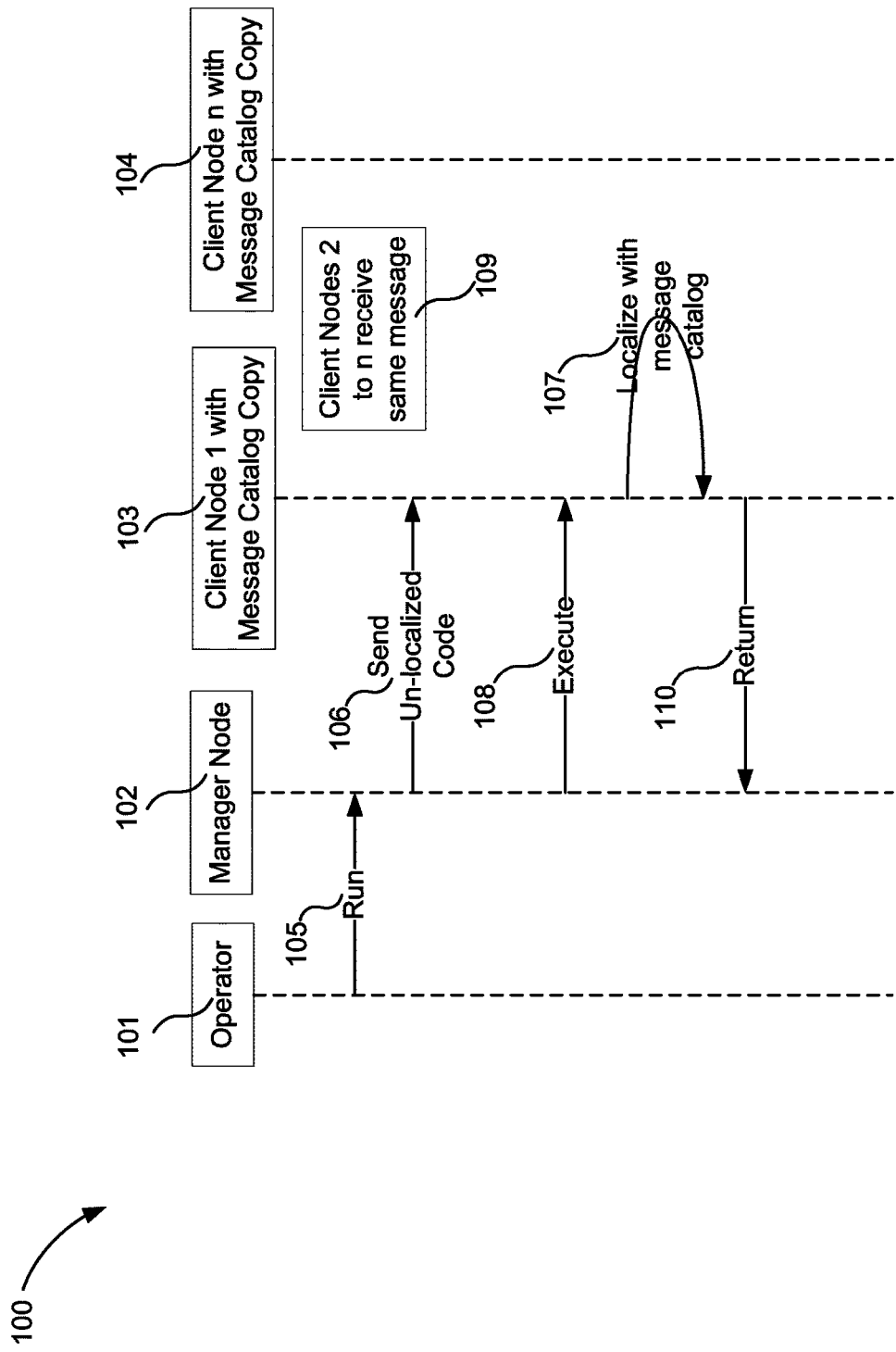
FIG. 1 is a data flow diagram showing run-time localization.

The present systems and methods describe a manager node comprising a message catalog and a preprocessor for localizing the executable code at run-time. The manager node searches for a number of tags or tokens to localize current target tags or tokens; and determines the tags' or tokens' unique identification and native language environment. The manager node then sends the localized executable code to client nodes to meet end user needs by translating the executable code into the end user's native language in one example.

A manager node for distributing a number of localization codes to client nodes includes: a network connection for providing services for sending localization codes to a client node over a network; a manager node for containing a message catalog to store localization code, tags or tokens; and a preprocessor programmed for reading tags or tokens associated with message catalog; and determining language for replacing current tags or tokens with new tags or tokens according to each tag or token's unique identification associated with its language environment.

A computer program product includes a computer readable storage medium, the computer readable storage medium comprising computer readable program code embodied therewith to update a module with tags or tokens which provide functionality for the module, the computer readable program code including: computer readable program code to read tags or tokens associated with a message catalog; and computer readable program code to determine tags needing replacement.

Localization may be implemented for a particular system or enterprise. These systems or enterprises comprise modules to be translated into the end user's native language. Localization may be distributed and executed on a number of client nodes. For example, localization may be distributed and executed on a large number of client devices within a business entity. There may be some desire to bring about localization that can be distributed to all the client nodes. Consequently, localization code may be distributed to each node independently to produce desired language output to better meet end user needs and translation requirements.

In order to make an internationally competitive software product, a language translation module within the software product may be designed to produce output in a number of different languages to accommodate users of different languages. Thus, this language translation module may be configured to translate words appearing to a user during execution of the software product into several languages in order for the user to understand and appropriately use the software product.

Also, in one example, new words may be added to the language translation module via a message catalog. A message catalog serves as a dictionary to translate one language into another language. A developer or administrator may make appropriate updates to the message catalog for each client node. This task may prove tedious and time consuming if, for example, the language translation module of thousands of client nodes are to be updated in a similar manner. In one example, if a developer or administrator uses run-time localization, the developer or administrator must make appropriate updates to thousands of client nodes individually. In another example, if a developer or administrator uses compile-time localization, the developer or administrator can not do updates once the localization code has been compiled. The developer or administrator must recompile the localization code if any updates are to be promulgated.

The subject matter disclosed in the present specification provides such a developer or administrator the ability to update the message catalog on a manager node. These localization updates made to the manager node are automatically delivered by the manger node to a number of client nodes as executable localization code. The present specification discloses methods and systems for centralized module localization. Consequently, the message catalog may be updated on the manager node and may be delivered automatically to the client nodes to suit the particular native language needs of an end user.

In various examples, the centralized module localization described is used by a developer or administrator to update a message catalog or translation service on the manager node or translation service endpoint. Once the message catalog is updated, it is then automatically delivered to the client nodes to better suit particular end user native language needs. This allows the developer or administrator to make fast updates through a network of client devices since there is a single maintenance point for localization: the manager node.

As used in the present specification and in the appended claims, the term "localization" is meant to be understood broadly as any process of translation of user-interactive characters, words, expressions, phrases, or sentences displayed to a user of a software product into a number of different languages. In one example, localization may further include cultural adaptation of the software product to conform to a cultural aspect of a region of the world. In another example, localization may be applied to software, video games, or websites among other forms of user-interactive words. In another example, localization may be applied to provide users with different dialects of a particular language.

Further, as used in the present specification and in the appended claims, the term "preprocessor" is meant to be understood broadly as a routine executed by a processor that processes source code before the code is compiled, resulting in altered source code.

Still further, as used in the present specification and in the appended claims, the terms "tag" or "token" is meant to be understood broadly as a string of characters categorized by a set of rules to match, specify, or recognize a sequence of a number of characters in a string of text.

Throughout this specification and in the appended claims, the term "centralized localization" refers broadly to a pre-defined function that will be performed on given inputs at a centralized computing device to produce desired output to a number of node computing devices. Consequently, centralized localization may encapsulate a manager node coupled with a preprocessor and message catalog. The manager node allows the operator access to the message catalog. The message catalog stores and contains all the desired languages and words needed for localization. The languages and words are associated with a number of tags or tokens to determine if a word can be translated from one language or another. Further, a unique language identification is associated with each tag or token that allow for specific language localization. In one example, these tags or tokens are searchable using a preprocessor programmed to search for and replace each tag or token according to the unique language of an end user. The unique tag identification may be provided for a number of languages. For example, a unique tag identification may be provided for a portion of or all known languages.

Thus, aspects of the present specification may be embodied as a system, method, or computer program product. Accordingly, aspects of the present specification may take the form of hardware or a combination of hardware and software. Furthermore, aspects of the present specification may take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, a network based service, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wireline, optical fiber cable, RF, etc., or any suitable combination of the foregoing. Computer program code for carrying out operations of the present specification may be written in an object oriented programming language such as Java, Smalltalk, or C++, among others. Computer program code for carrying out operations of the present specification may also be written in declarative programming language such as Structured Query Language. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider). Further, the remote computer may be connected to the user's computer through a wired or wireless network.

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks In one example, these computer program instructions may be stored in a computer-readable memory that can direct a computer or other programmable data processing apparatus to function in a particular manner, such that the instructions stored in the computer-readable memory produce an article of manufacture including instructions which implement the functions/acts specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus implement the functions/acts specified in the flowchart and/or block diagram block or blocks.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a data flow diagram (100) showing run-time localization that distributes the un-localization code to client nodes. In FIG. 1, a data flow diagram (100) depicts an operator (101) sending (106)

un-localized code over a network, such as, for example, the Internet, to a number of client nodes (103, 104). Although only two client nodes (103, 104) are depicted, as indicated by client node (104) being designated as "client node n," the system may comprise any number of client nodes (103, 104). Further, it should be noted that client node n (104) is to be referred to as the last client node in the range of client nodes that received the un-localized code. These un-localized codes are then localized and executed (108) using individual message catalogs located on each of the client nodes (103, 104).

In the example of FIG. 1 the operator (101) desires to update a system to add more tags to the message catalogs within the client nodes (103, 104) in order to expand the number of characters, words, expressions, phrases, or sentences within the message catalogs. The operator (101) runs (105) a command that sends un-localized code (106) from the manager node (102) along with executable code (108) to the client nodes (103, 104) containing a copy of the message catalog (212). At either run-time or compile-time, a process uses the message catalog with the un-localized code to produce (107) executable localized code in the appropriate language. For example, the process replaces the current tags with language appropriate tags. This localized executable code is executed on the client nodes (103, 104). The operator (101) sends the un-localized code to each client node (103, 104) where the code is localized into executable code. In one example, the code is localized into executable code by replacing the tag with the target language tag via the message catalog.

In keeping with the example given above of having the operator (101) send (106) un-localized code to the client nodes (103, 104) where the code is localized (107) with a message catalog, suppose that the developer or administrator desires to update the message catalog on all the client nodes (103, 104). Further, suppose that the client nodes (103, 104) have grown to be in the thousands. Using a compile-time method, a developer or administrator must recompile or repack the module every time an update is been made to the message catalog. Alternatively, using a run-time method a developer or administrator must maintain a message catalog on every client node (103, 104). Thus, the developer or administrator must recompile, repack, or maintain several message catalogs on client nodes (103, 104) when a desired update is made.

Figure 2:
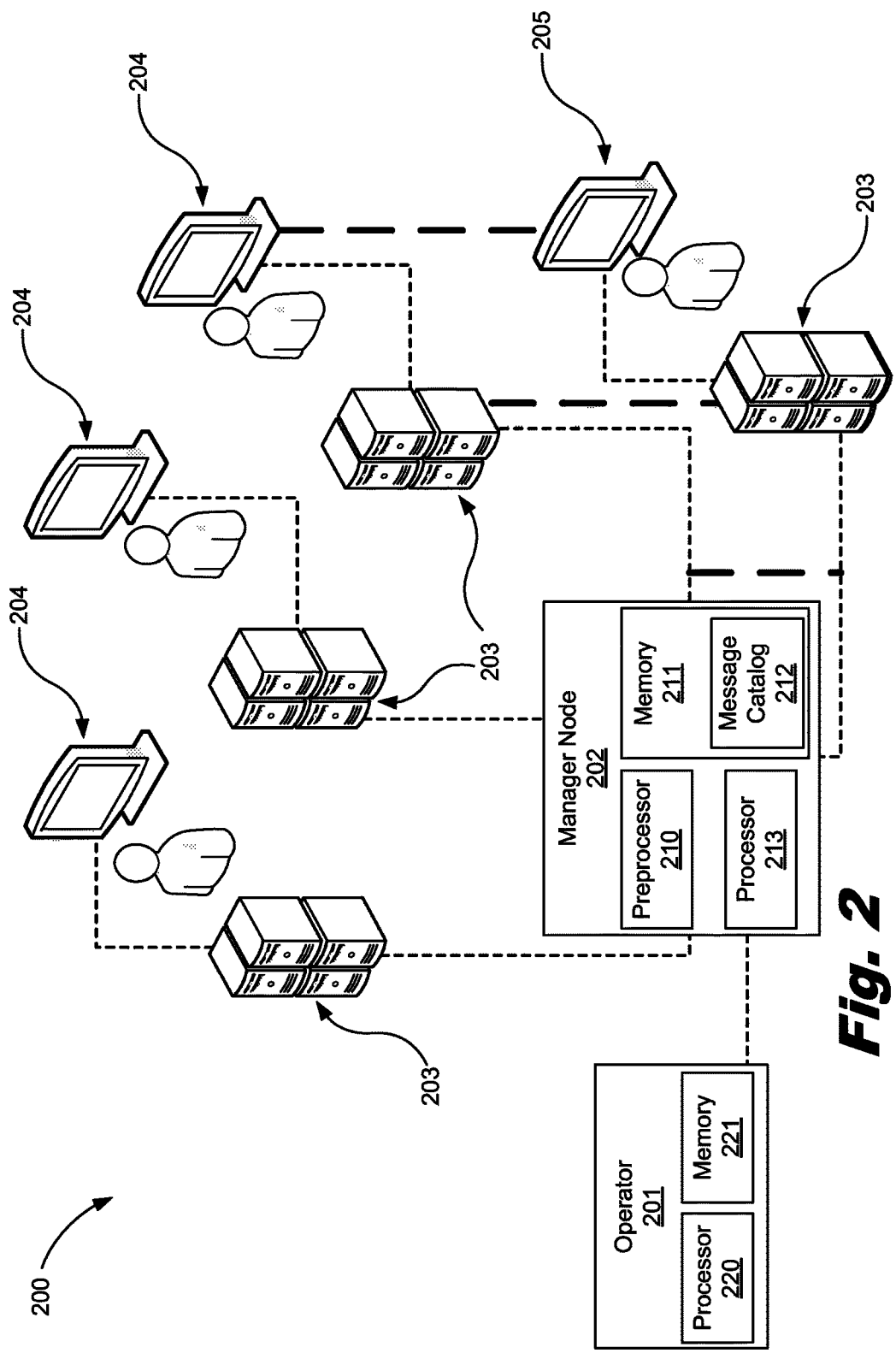
FIG. 2 is a diagram showing a system employing centralized localization in a distributive environment, according to one example of the principles described herein.

FIG. 2 is a diagram showing a data flow within a method utilizing centralized localization in a distributive environment, according to one example of the principles described herein. FIG. 2 shows a system (200) that utilizes centralized localization. The operator (201) accesses the manager node (202) via a user interface. The operator (201) desires to update a message catalog (212). The message catalog (212) is maintained on the manager node (202) within memory (211). The operator (201) makes a number of updates to the localization code in the message catalog (212).

For example, the operator (201) instructs the manager node (202) via the processor (213) to update the message catalog (212) stored within the memory (211) of the manager node (202). In this example, the processor (213) of the manager node (202) updates the localization code in the message catalog (212) as instructed by the operator (201) via the preprocessor (210). The processor (213) may include the hardware architecture or a combination of hardware and software architecture for retrieving executable code from the memory (211) and executing the executable code. The executable code, when executed by the preprocessor (210), causes the processor (213) and preprocessor (210) to implement at least the functionality of updating the message catalog (212) and distributing an executable for consumption by a number of client nodes (203, 205) as described herein. In the course of executing code, the preprocessor (210) may receive input from and provide output to a number of the remaining hardware units. In this manner, the localization code of the message catalog (212) is made executable.

The localization code is automatically sent over a network from the manager node (202) where the executable localization code is received and executed by the client nodes (203, 205). It should be noted that client node (205) is the n node or last node in the series of nodes that the developer or administrator is sending the executable localization code to (209). Thus, all the client nodes (203, 205) receive the same updated executable localization code, from a single maintenance point or source; namely, the manager node (202). The end users (204) are able to view the text portion of the software product in their native language due to the local execution of the localization code.

Further, it should be noted that the executable localized code is language specific; the localized executable code may differ from language to language. For example, assume one client speaks Spanish and another client speaks French. Further, assume each client desires to have the same message translated into their native language. Each language follows different rules for syntax as well as different characters comprising each word to be translated. When the message is translated into Spanish or French the characters order, words, or phrases will be changed or reordered, and will no longer be identical to each other. When the code is localized into an executable where the executable localized code is in Spanish, this Spanish-localized code does not match the executable localized code in French. Thus, executable localized code is language specific.

The network architecture shown in FIG. 2 is one example of how the present systems and methods may be implemented. In the present example, for the purposes of simplicity in illustration, the operator (201), the manager node (202), and client nodes (203, 205) are separate devices communicatively coupled to each other. However, the principles set forth in the present specification extend equally to any alternative configuration in which the operator (201), the manager node (202), and client nodes (203, 205) are configured as one device, or two devices with one device comprising one of these devices, and the other device comprising two of these devices. As such, alternative examples within the scope of the principles of the present specification include, but are not limited to, examples in which the operator (201), the manager node (202), and client nodes (203, 205) are implemented by the same computing device, examples in which the functionality of the operator (201), the manager node (202), or client nodes (203, 205) are implemented by multiple interconnected computers, and examples in which the operator (201), the manager node (202), and client nodes (203, 205) communicate directly through a bus without intermediary network devices.

In one example, the manager node (202) may be a remotely-hosted or may be a cloud-based translation service rather than a locally-executed program. In this example, a third party may provide such a service where a translation is obtained remotely. This service may provide a more up-to-date version of a message catalog (212) since a business would have more centralized control over translation. Further, in one example, the message catalog (212) may be updated from a single service rather than a manager node (202). Thus, if a number of manager nodes (202) containing a number of message catalogs (212) are to be updated, only a few operators (201) may be required to instruct the manager nodes (212) to make such an update for such a service since it is easier to update a single service.

Figure 3:
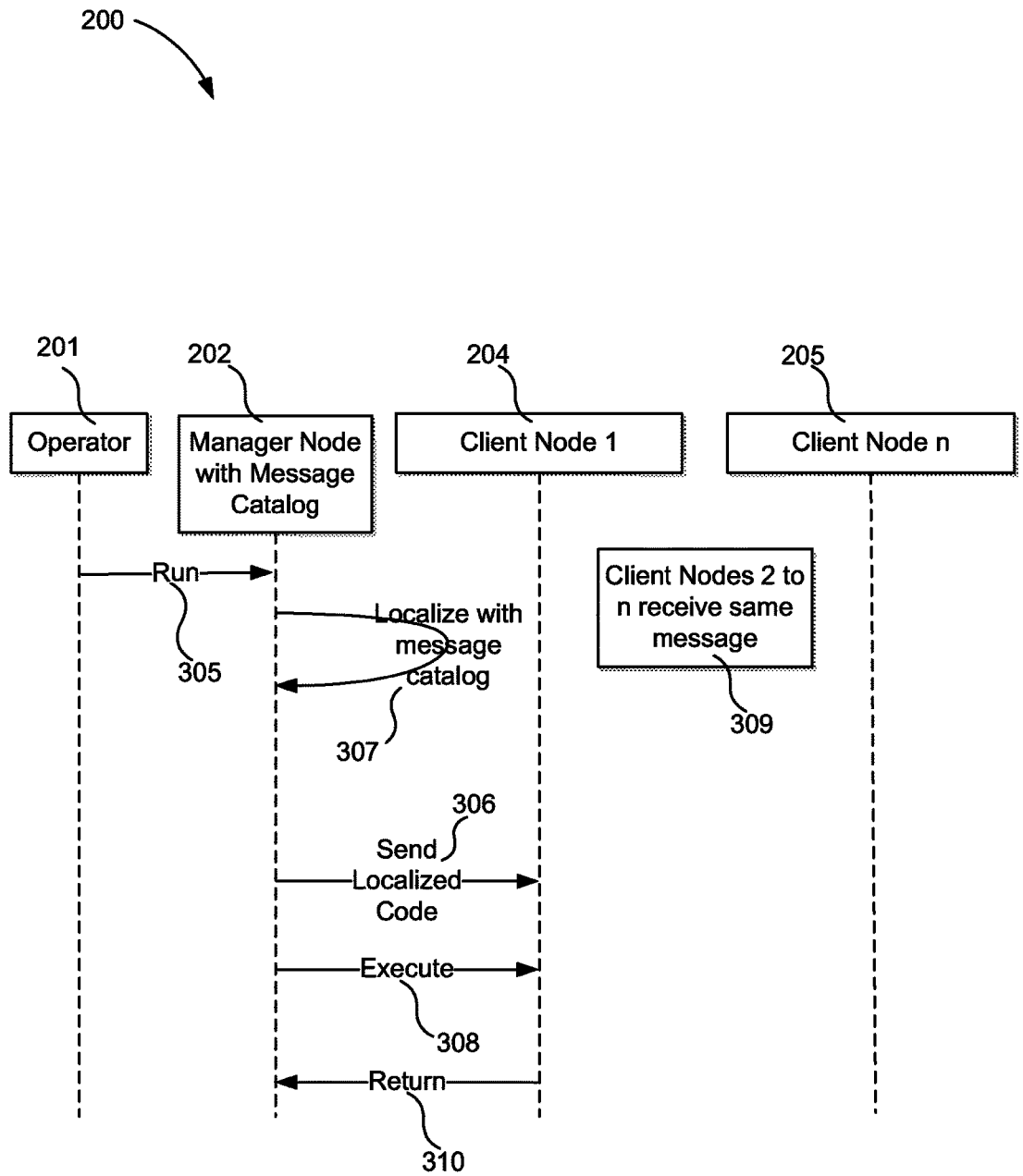
FIG. 3 is a diagram showing a data flow within a method utilizing centralized localization in a distributive environment, according to one example of the principles described herein.

FIG. 3 is a diagram showing a data flow within a method utilizing centralized localization in a distributive environment, according to one example of the principles described herein. FIG. 3 shows how the system (200) of FIG. 2 invokes centralized localization. The operator (201) developer or administrator may desire to update the message catalog (FIG. 2, 212). The localized code that was associated with the message catalog (FIG. 1, 107) as described above is only localized on the individual client nodes (103, 104). However, using centralized localization, the message catalog (FIG. 2, 212) is coupled with the manager node (202). Thus, the un-localized code is now localized (307) with the message catalog (FIG. 2, 212) on the manager node (202) before the code is sent to the client nodes (203, 205). Once the executable code has been localized on the manager node (302), it is sent (306) automatically to the client nodes (203, 205). Thus, the localized executable code has been sent to all the client nodes (203, 205) from a single maintenance point; the manager node (202).

Further, client node n (205) is the last node in the series of client nodes that the localization code is sent to. Additionally, client nodes 2 to n will receive the same message (309) that client node 1 (204) received. Thus, in this manner, all the client nodes (203, 205) will receive the same localization executable code. The system allows the developer or administrator to make fast updates to the code from a single maintenance point. This reduces chances for errors, and processing resources since the localization is performed one time on the manager node (202), instead of n times for an n-node distribution system.

Figure 4:
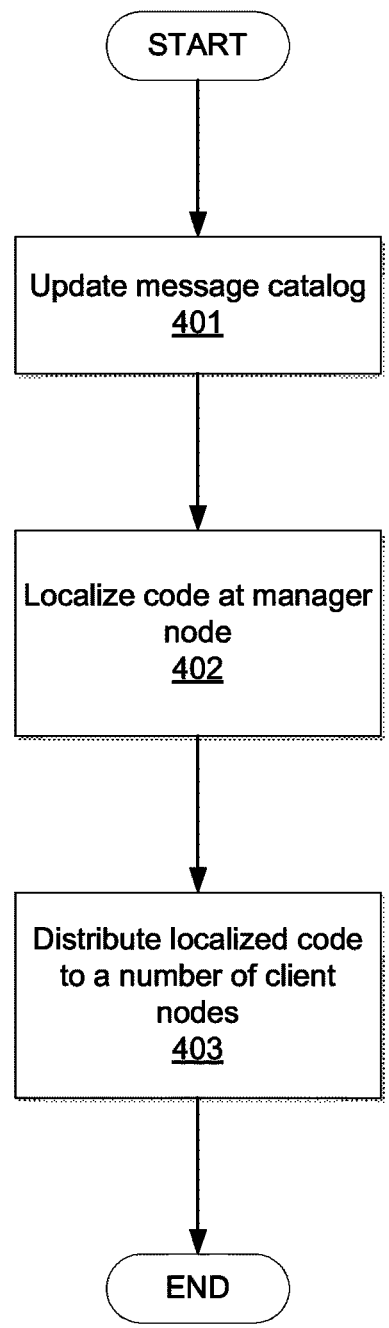
FIG. 4 is a flowchart showing a method for central localization, according to one example of the principles described herein.

FIG. 4 is a flowchart showing a method for central localization (FIG. 3, 300), according to one example of the principles described herein. The centralized localization systems and methods described herein may be implemented using hardware or a combination of hardware and software.

The centralized localization process may begin by updating (block 401) the message catalog (FIG. 2, 212). In one example, the developer or administrator may desire to correct an error or spelling of a word in a different language. Alternatively, the developer or administrator may desire to add new words or languages to the existing message catalog. As noted above, this message catalog (FIG. 212) may be stored on the manager node (FIG. 2, 202) accessed by a network by, for example, an operator (201).

Once the appropriate updates have been made to the message catalog (FIG. 2, 212) (block 401), with the preprocessor (210), the manger node (FIG. 2, 202) localizes (block 402) the executable code at run-time. The localized code is automatically distributed (block 403) to all the client nodes (203, 205). Thus, each client node (203, 205) receives the same executable localization code from the message catalog (FIG. 2, 212). In one example, if any undesired operation or translation were to occur, the developer or administrator would update the message catalog (FIG. 2, 212) and maintain it from a single system; namely, the manager node by repeating the process described above.

In another example, a mobile version of the present systems and methods may be implemented for use by mobile devices, such as, for example, smart phones. Such mobile devices may, when network access is available, output or translate information into an end user's native language. For example, a mobile device may run an application that displays dates, currency, and other measurements or parameters. In one example, the application may be programmed to auto detect the end users native local parameters or language. In this example, if the end user travels from his native country into another country that does not speak the same language or use the same currency, the mobile device may be able to auto detect that the end user is no longer in the native country. In such a case, the end user may not know the currency exchange. Further the end user may want to know how much a certain item will cost. The mobile device is able to translate the cost of the item into the end users native currency. Other language translation tasks may be completed by the mobile device in the example above.

Figure 5:
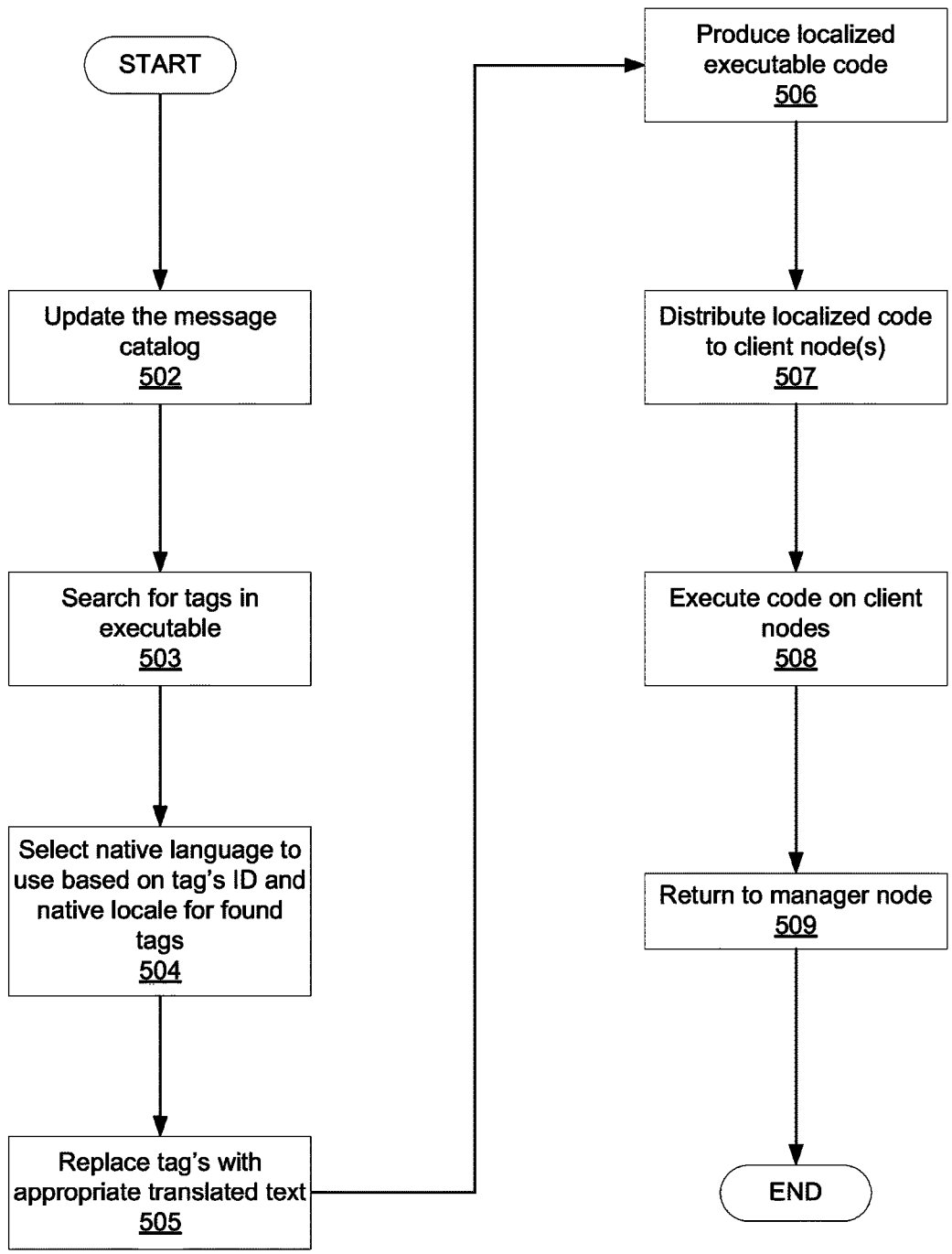
FIG. 5 is a flowchart showing a method for central localization, according to another example of the principles described herein.

FIG. 5 is a flowchart showing a method for central localization, according to another example of the principles described herein. The method of FIG. 5 may begin by updating (block 502) the message catalog (FIG. 2, 212). In one example, updating (block 502) the message catalog (FIG. 2, 212) may comprise adding a number of tags within the manager catalog (FIG. 2, 212). In one example, the developer or administrator may desire to update any errors in language translation, add new words, or add a new language to the message catalog (FIG. 2, 212) in order to meet a number of end users' language localization needs. The system (FIG. 2, 200) uses the manager node (FIG. 2, 202) with the preprocessor (FIG. 2, 210) that is programmed to localize executable code at run-time. The preprocessor (FIG. 2, 210) is programmed to search (block 503) for tags in the executables. Tags signify that the code, or portions thereof, needs to be translated (i.e., localized) into another language. Thus, the manager node (FIG. 2, 202) is able to search for words that need to be translated into the end users native language using the preprocessor (FIG. 2, 210).

After the desired tags have been found using the preprocessor (FIG. 2, 212), the tag's unique identification will allow the module to select (block 504) the native language to be used. Each tag has a unique identification associated with each language stored in the message catalog. The preprocessor is programmed to determine which language is to be selected according to the identification set forth in the module, allowing the words to be correctly translated into the native language of the end user. Once these words have been correctly identified, the tag is automatically replaced (block 505) with the appropriate translated text according the tag's unique identification.

Replaced tags are combined with the executable code to produce (block 506) localized executable code. This executable localized code is now in the native language of the end user. The localized executable code is distributed (block 507) to an unlimited number of client nodes. In one example, distribution of the localized execution code is performed automatically by the manager node (FIG. 2, 202). Thus, localization is performed once on the manage node (FIG. 2, 202), instead of n number of times for an n-node distribution system. Any updates that are desired are updated on the manager node (FIG. 2, 202) using the message catalog (FIG. 2, 212) and are automatically distributed and executed (block 508) on the client nodes (FIG. 2, 203, 205). Once the localized code is distributed on the client nodes (508) the program returns (block 509) to the manager node (FIG. 2, 202).

Thus, in the above example, all the localization may take place on the manager node (FIG. 2, 202) and localized code is sent to the client nodes (FIG. 2, 203, 205). Each client node (FIG. 2, 203, 205) receives a copy of the localizations from the manager node (FIG. 2, 202).

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which comprises a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

The specification and figures describe localization of computer program code. The system and methods, with a manager node, updating a message catalog, localizing code at the manager node, and distributing the localize code to a number of client nodes. These systems and methods may have a number of advantages, including: (1) the message catalog resides on the manager node which avoids the problem of having to maintain a message catalog for every target node in a large distributed system; (2) when user-facing text needs to be changed, the developer or administrator may simply change the message catalog on the manager node while the changes are automatically delivered by the manager node to the client nodes; (3) the present systems and methods allow the developer or administrator to make faster changes to the code since there is a single maintenance point for localization (4) the present systems and methods also reduce the chances of errors because all nodes in a distributed system will have identical copies of the code; and (5) processing resources are reduced because localization is performed once, on the manager node, instead of n times for an n-node distributed system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of localizing a computer program code comprising, with a manager node:
    updating a message catalog, the message catalog comprising a dictionary to translate a first language into a second language;
    localizing code at the manager node at run-time, wherein localizing code at the manager node comprises:
        searching for a number of tags in an executable in the computer program code;
        selecting a native language to apply based on an identification of the tag, a native language, and a unique language identification associated with the tag, the unique language identification defining a language into which the tags are to be translated; and
        replacing a tag with a corresponding translated text; and
    distributing the localized code to a number of client nodes, in which updating the message catalog comprises correcting a number of errors in the message catalog.

2. An apparatus for localizing computer program code, comprising:
    a processor; and
    a memory communicatively coupled to the processor;
    in which the memory comprises a message catalog, the message catalog comprising a dictionary to translate one language into another language, and
    in which the processor:
        updates the message catalog, the message catalog comprising a dictionary to translate a first language into a second language;
        corrects a number of errors in the message catalog;
        localizes the computer program code at a manager node, in which localizing the computer program code comprises: searching for a number of tags in an executable in the computer program code;
            selecting the first language to apply based on an identification of the tag, a native language, and a unique language identification associated with the tag, the unique language identification defining a language into which the tags are to be translated; and
            replacing a tag with a corresponding translated text; and
        distributes localized computer program code to a number of client nodes,
    in which the number of client nodes are mobile computing devices, the mobile devices comprising a location detection device to determine the location of the mobile devices,
    in which, if the location detection device determines that a first of the mobile devices is not located in a native location, then updating the message catalog such that the first mobile device outputs information based on a current location of the first mobile device.

3. The apparatus of claim 2, further comprising a preprocessor, in which, the preprocessor, when instructed by the processor:
    searches for the number of tags in the executable in the computer program code;
    selects the first language to apply; and
    replaces the tag with the corresponding translated text.

4. The apparatus of claim 3, in which the preprocessor produces a localized executable code.

5. The apparatus of claim 2, in which the processor distributes the localized computer program code to the client nodes.

6. The apparatus of claim 5, in which the localized code is executable on the client nodes.

7. A computer program product for localization of computer code, comprising:

a non-transitory computer readable storage medium comprising computer usable program code embodied therewith, the computer usable program code to, when executed by a processor;

update a message catalog, the message catalog comprising a dictionary to translate a first language into a second language;

select a native language to apply to a number of client nodes, in which selecting a native language to apply comprises selecting a native language to apply based on a unique language identification associated with each of a number of tags, in which the unique language identification defines a language into which the tags are to be translated;

localize code at a manager node; and distribute the localized code to the number of client nodes.

8. The computer program product of claim 7, further comprising:

computer usable program code to, when executed by the processor, search for the number of tags in an executable in the computer program code; and computer usable program code to when executed by the processor, replace a tag with a corresponding translated text.

9. The computer program product of claim 7, further comprising computer usable program code to, when executed by the processor, produce a localized executable code.

10. The computer program product of claim 7, in which the computer usable program code to, when executed by the processor, localize code at a manager node further comprises computer usable program code to, when executed by the processor, localize the code at run-time.

11. The apparatus of claim 2, in which the information based on a current location of the first mobile device comprises local currency exchanges, dates, measurements, word translations, or combinations thereof.

\* \* \* \* \*